(12) United States Patent
Mueller et al.

(10) Patent No.: US 10,061,574 B2
(45) Date of Patent: Aug. 28, 2018

(54) METHOD AND APPARATUS FOR MULTIPLE VEHICLE SOFTWARE MODULE REFLASH

(71) Applicant: Ford Global Technologies, LLC, Dearborn, MI (US)

(72) Inventors: Paul Mueller, St. Clair Shores, MI (US); Medville J. Throop, Ann Arbor, MI (US); Brian David Tillman, Dearborn, MI (US); April Deneane Johnson, Canton, MI (US); Gregory William Farrey, Ypsilanti, MI (US); Jason Michael Miller, Woodhaven, MI (US); John Dolinsky, Ann Arbor, MI (US); Charles Henry Nagi, Livonia, MI (US); Thomas Eric Svenson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 13/803,850

(22) Filed: Mar. 14, 2013

(65) Prior Publication Data

US 2014/0282467 A1  Sep. 18, 2014

(51) Int. Cl.
*G06F 8/65* (2018.01)
*G06F 8/654* (2018.01)

(52) U.S. Cl.
CPC ............ *G06F 8/65* (2013.01); *G06F 8/654* (2018.02); *G06F 8/66* (2013.01)

(58) Field of Classification Search
CPC ............ G06F 8/66; G06F 8/665; G06F 8/65
See application file for complete search history.

(56) References Cited

U.S. PATENT DOCUMENTS

| 5,708,425 | A | 1/1998 | Dwyer et al. |
|---|---|---|---|
| 7,366,589 | B2 | 4/2008 | Habermas |
| 7,506,309 | B2 * | 3/2009 | Schaefer ............ 717/120 |
| 7,848,278 | B2 | 12/2010 | Chen et al. |
| 8,332,817 | B2 | 12/2012 | Li et al. |
| 9,557,981 | B2 | 1/2017 | Throop et al. |

(Continued)

FOREIGN PATENT DOCUMENTS

| DE | 102004017602 A1 | 10/2005 |
|---|---|---|
| WO | 2009027208 A1 | 5/2009 |

OTHER PUBLICATIONS

Drew Technologies—CarDAQ-Plus J2534 Pass-Thru & Hosting Device, printed from allobd.com/proddetail, Oct. 29, 2010.

(Continued)

*Primary Examiner* — Jacob D Dascomb
(74) *Attorney, Agent, or Firm* — Jennifer Stec; Brooks Kushman P.C.

(57) ABSTRACT

A system includes a processor configured to wirelessly receive update requests from a plurality of vehicles. The processor is also configured to, for each request, determine if any vehicle modules require updating. Also, the processor is configured to retrieve an updated version and sending the updated version to a vehicle for reflashing, for each module that requires updating. The processor is additionally configured to receive confirmation for each module that has been reflashed and update a vehicle configuration with a version identifier corresponding to the updated version for each reflashed module.

8 Claims, 3 Drawing Sheets

(56) References Cited

U.S. PATENT DOCUMENTS

| | | |
|---|---|---|
| 2003/0167354 A1 | 9/2003 | Pepper et al. |
| 2004/0187011 A1 | 9/2004 | Lee et al. |
| 2004/0251073 A1 | 12/2004 | Herle et al. |
| 2005/0149481 A1 | 7/2005 | Hesselink et al. |
| 2005/0152318 A1 | 7/2005 | Elbatt et al. |
| 2005/0216902 A1* | 9/2005 | Schaefer .............. 717/168 |
| 2005/0256614 A1* | 11/2005 | Habermas ............ G06F 8/65 701/1 |
| 2007/0168957 A1 | 7/2007 | Li et al. |
| 2007/0185624 A1 | 8/2007 | Duddles et al. |
| 2008/0005733 A1 | 1/2008 | Ramachandran et al. |
| 2008/0162036 A1 | 7/2008 | Breed |
| 2009/0119657 A1* | 5/2009 | Link, II .............. 717/171 |
| 2009/0260057 A1 | 10/2009 | Laberteaux et al. |
| 2010/0144367 A1 | 6/2010 | Goh et al. |
| 2011/0078675 A1 | 3/2011 | Van Camp et al. |
| 2011/0173603 A1* | 7/2011 | Nakamura et al. ...... 717/173 |
| 2012/0144378 A1 | 6/2012 | Shah |
| 2013/0031540 A1* | 1/2013 | Throop .............. G06F 8/665 717/173 |
| 2013/0053003 A1* | 2/2013 | King, II .............. H04W 4/00 455/414.1 |

OTHER PUBLICATIONS

Lancer Evolution: ECU Reflash Upgrade—2009 Ralliart remote ECU reflashing services, printed from http://www.floridaevosclub.com/f32/2009-ralliart-remote-ecu-reflashing-services-41.htm, Sep. 17, 2009.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

Chinese Patent Office, First Office Action for the corresponding Chinese Patent Application No. 201410096580.9, dated Jan. 3, 2018.

* cited by examiner

METHOD AND APPARATUS FOR MULTIPLE VEHICLE SOFTWARE MODULE REFLASH

TECHNICAL FIELD

The illustrative embodiments generally relate to a method and apparatus for multiple vehicle software module reflash.

BACKGROUND

Many vehicles now include complex computing systems as part of their general builds. From infotainment systems to power-train control, computer software and hardware makes up an integral part of the vehicle infrastructure.

Like many other computer components (hardware or software), these systems can often benefit from updates. In many cases, this requires a flash of the memory, which is an overwrite of core software on non-volatile memory that typically cannot otherwise be changed. Since the software is often critical, it is important that these updates not be done in an ad hoc manner, and there are often relatively complicated (compared to simple software installation procedures) processes involved in re-flashing memory.

In many cases, the re-flash of certain components will require a trip to the dealership, to ensure the update is done properly. In other cases, the user may be provided with a series of instructions and steps to perform to properly perform the reflash. But, since software updates can be frequent, it can become somewhat of a hassle for a user to keep their system entirely up-to-date. Even more so when a fleet of vehicles is involved.

U.S. Application Publication 2005/0216902 generally relates to a system and method of managing a software configuration update of a vehicle. A first software module is identified and vehicle configuration data representative of a first vehicle software configuration is retrieved. A determination is made whether the first software module is compatible with the first vehicle software configuration at a call center. A second vehicle software configuration is sent from the call center to a telematics unit via a wireless network based on the determination. A computer usable medium with suitable computer program code is employed for managing the software configuration update of the vehicle.

U.S. Application Publication 2013/0031540, filed on Jul. 26, 2011, generally relates to a computer-implemented method that includes determining that a connection to an update server should be established. The method also includes establishing a wireless connection with the update server. The method further includes sending at least a VIN number to the update server and downloading one or more module updates corresponding to the sent VIN number. Also, the method includes verifying the one or more downloaded updates. The method further includes flashing one or more modules to which the one or more updates correspond. Additionally, the method includes verifying the functionality of each module which has been flashed.

U.S. application Ser. No. 13/206,615, filed Aug. 7, 2011, generally relates to a computer-implemented method including receiving a restore command to restore a vehicle computing system (VCS) system state. The method further includes restoring a base system state to a known, functional state and obtaining a list of applications previously installed on the VCS. The method also includes for each application previously installed on the VCS, finding a version of the application compatible with the restored base system state. Also, the method includes installing the version of each application compatible with the restored base system state.

SUMMARY

In a first illustrative embodiment, a system includes a processor configured to wirelessly receive update requests from a plurality of vehicles. The processor is also configured to, for each request, determine if any vehicle modules require updating. Also, the processor is configured to retrieve an updated version and sending the updated version to a vehicle for reflashing, for each module that requires updating. The processor is additionally configured to receive confirmation for each module that has been reflashed and update a vehicle configuration with a version identifier corresponding to the updated version for each reflashed module.

In another illustrative embodiment, a computer-implemented method includes wirelessly receiving update requests from a plurality of vehicles. The illustrative method also includes, for each request, determining if any vehicle modules require updating. The method additionally includes retrieving an updated version and sending the updated version to a vehicle for reflashing, for each module that requires updating. The method further includes receiving confirmation for each module that has been reflashed and updating a vehicle configuration with a version identifier corresponding to the updated version for each reflashed module.

In a third illustrative embodiment, a non-transitory computer readable storage medium stores instructions that, when executed by a processor, cause the processor to perform a method including wirelessly receiving update requests from a plurality of vehicles. The illustrative method also includes, for each request, determining if any vehicle modules require updating. The method additionally includes retrieving an updated version and sending the updated version to a vehicle for reflashing, for each module that requires updating. The method further includes receiving confirmation for each module that has been reflashed and updating a vehicle configuration with a version identifier corresponding to the updated version for each reflashed module.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
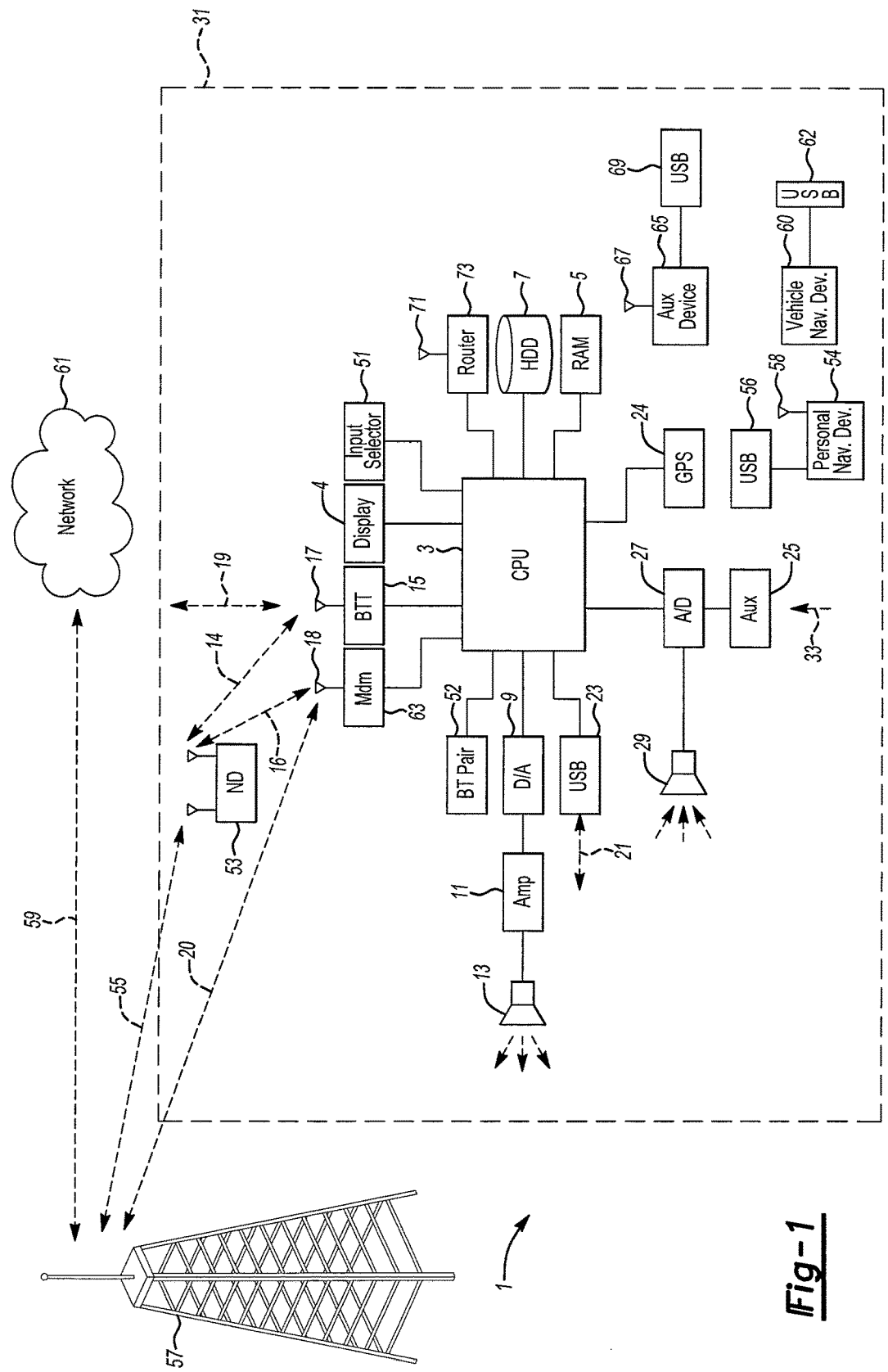
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61.

As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

U.S. Application Publication 2013/0031540, filed on Jul. 26, 2011, and U.S Application Publication 2013/0042231, filed Aug. 7, 2011, are commonly owned applications and the contents thereof are hereby incorporated by reference.

Vehicle modules such as PCM or TCMs often need to have their resident software upgraded or revised. Vehicle testing programs and retail field servicing actions incur large time and cost penalties if multiple vehicles or development platforms are manually re-flashed. Currently, in many cases each test vehicle/platform must be located, manually inventoried as to software level and hardware part number and manually re-flashed using a service or diagnostic tool.

The illustrative embodiments represent processes that may be executed simultaneously for a fleet of vehicles, which may individually differ in their module hardware and/or software configurations. Any individual reflash event may take place simultaneously with the rest of the fleet, depending on which vehicles connect to the server.

A secure OEM server stores software for production vehicle module flashing/reflashing, and may also be provided in a version hosting only development vehicle module software.

The illustrative embodiments described herein allow for reflashing of multiple fleet vehicles with multiple modules on each fleet vehicle. They provide for automatic documentation of entire flash events for a vehicle and immediate upload to the vehicle configuration database. Further, they allow for automatic detection of vehicle hardware configurations, communication of that configuration to a secure server, and assembly of package and secure transmission to a vehicle, aiding in ensuring that each vehicle is flashed according to its specific configuration. Since the vehicle initiates communication with the remote server to enact the embodiments, this provides additional security, as vehicles cannot be pinged to discover their individual IP addresses (making them vulnerable to hackers).

Figure 2:
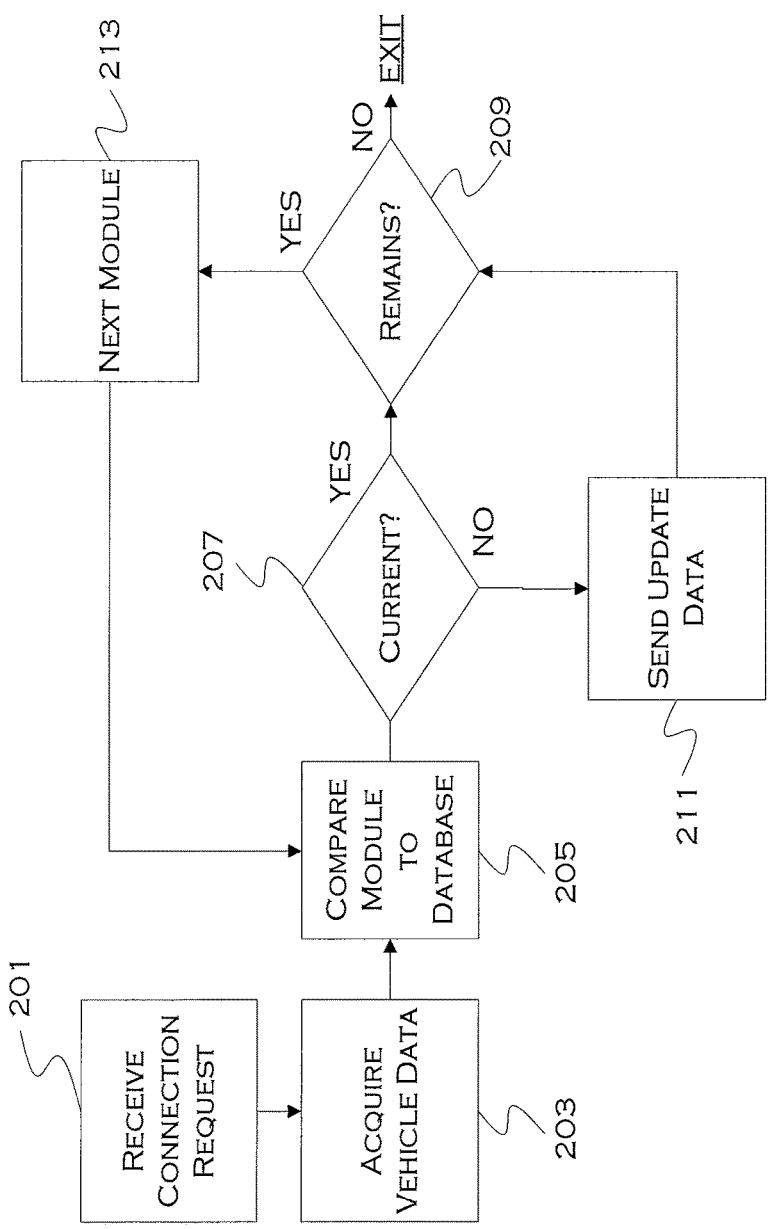
FIG. 2 shows an illustrative process for updating multiple modules on a single vehicle.

FIG. 2 shows an illustrative process for updating multiple modules on a single vehicle. In a fleet example, a number of vehicles may simultaneously connect to a particular server and request simultaneous updates. In the illustrative embodiments, the vehicles contact the server for update purposes. Thus, whenever a vehicle is connected, the module information can be provided to the server and the server can compare this information to existing information (for consistency) and update any modules for the vehicle having the specific configuration relating to that particular vehicle.

In this illustrative example, the server receives a connection request from a vehicle 201. Various validation processes may be implemented to ensure the request is a viable one, and once these are completed (if desired), then the server may acquire vehicle data 203. Vehicle data can include, but is not limited to, module software versions, various component installations, etc. This can include identifiers for after-market components, as well as confirmation that various OEM installed components are still installed.

Although the remote server can keep a record of the configuration of a particular vehicle, it may still be useful to verify this configuration before proceeding with a module update. Once a software version has been received (and confirmed with stored data, if desired), the module version can be compared to a database containing the most recent module(s) for a vehicle of a particular configuration 205.

If the module is current 207, and no further modules remain 209, the process can exit. If other modules remain for updating on a particular vehicle, the process can move to a next module 213 and repeat the check and update process for all remaining modules.

If a particular software module is not current, the process can send update data to the vehicle 211 and begin a remote reflash process. One example of this process is described in the incorporated 2013/0031540 reference. For each module that requires updating, this process can be repeated so as to fully (within constraints, such as time) update the vehicle upon connection.

Since a remote server can handle a number of these requests, fleet managers, as well as general consumers, can be assured that their software is reasonably up-to-date at any time a connection to the remote server can be established. This can help avoid the difficulties of tracking whether or not a new software version has been installed.

Figure 3:
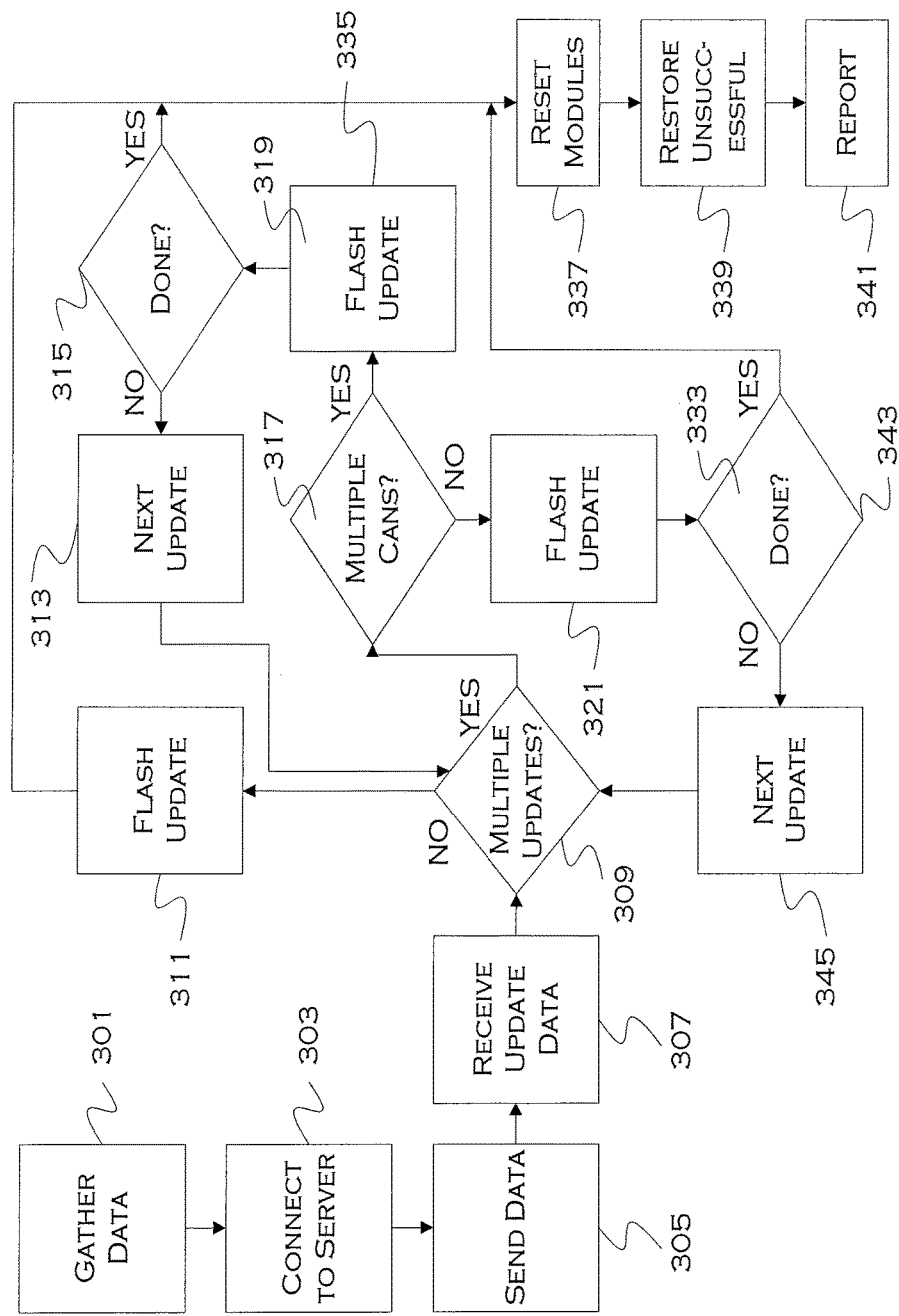
FIG. 3 shows an illustrative process for simultaneously updating multiple modules.

FIG. 3 shows an illustrative process for simultaneously updating multiple modules. This illustrative example is similar to that of FIG. 2, but it allows for faster updating because different modules on different busses can be updated simultaneously.

In this illustrative example (shown from the vehicle side), the process gathers data relating to installed components and software module versions 301. Then, once sufficient data is present, and if a connection is present, the process connects to a remote server 303 so that the vehicle-related data can be sent 305.

Once the remote server has received all of the appropriate vehicle data, a process such as that shown in FIG. 2 can occur. In this instance, the process will aggregate and send the updates (as opposed to sending them and processing them one at a time), this will allow a vehicle with multiple modules on multiple busses to reflash those modules simultaneously.

The compiled update data will be received by the vehicle 307 and the vehicle will determine if multiple updates are needed, or if just a single module needs to be reflashed 309.

If only a single module needs flashing, the process will flash the single update 311. The reflashed module will then receive a reset command 337 so that it leaves reprogramming state. Any unsuccessful flashes are also restored to their original state 339, so as to not interfere with the operation of any vehicle systems. The process then updates the remote server on the successes and failures 341.

If there are multiple updates, the process will check to see if there are modules on multiple busses, each of which needing updates 317. If there are not, then the process will flash a single update to a module on a first bus 321, and then, assuming that modules still remain 343, the process will proceed to a next update 345 and repeat.

If there are multiple modules on multiple busses, the process will flash those modules at the same time 335. Once completed, if there are remaining updates 315, the process will continue with the next update(s) 313. In this manner, a particular vehicle is reflashed in an efficient manner and most or all modules are updated to new versions. If any failed versions are reported, the process can attempt to update these versions again, or wait for a later time at which to try.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor that:
receives a plurality of wireless update requests from a plurality of vehicles; and
for each of the plurality of wireless update requests:
retrieves vehicle data based on an identifier of a respective vehicle, wherein the vehicle data comprises one or more identifiers that identify one or more aftermarket hardware components installed in the respective vehicle;
determines, based on the one or more identifiers, which of the one or more aftermarket hardware components require updating;
aggregates software updates for each of the one or more aftermarket hardware components that require updating;
transmits the aggregated software updates to the respective vehicle;
receives, from the respective vehicle, a notification of software modules of one or more aftermarket hardware components that failed to update; and
re-transmits software updates for the failed one or more software modules of the one or more aftermarket hardware components that failed to update to the respective vehicle; and
each of the plurality of vehicles configured to:
receive, from the processor, the aggregated software updates;
flash software modules corresponding to the aggregated software updates;
determine the one or more of the aftermarket hardware components that failed to update;
restore the software modules of the one or more aftermarket hardware components that failed to update to a previous state;
wirelessly transmit a notification of the one or more aftermarket hardware components that failed to update to the processor;
receive, from the processor, the re-transmitted software updates; and
re-flash the software modules of the one or more aftermarket hardware components that failed to update.

2. The system of claim 1, wherein the processor is configured to compare received module versions against stored module versions from a module database to determine which modules require updating.

3. The system of claim 2, wherein the processor is further configured to determine which stored module versions from the module database are appropriate for comparison purposes based at least in part on the one or more aftermarket hardware components installed in each respective vehicle.

4. A computer-implemented method comprising:
receiving, by a server, a plurality of wireless update requests from a plurality of vehicles; and
for each of the plurality of wireless update requests:
retrieving, by the server, vehicle data based on an identifier of a respective vehicle, wherein the vehicle data comprises one or more identifiers that identify one or more aftermarket hardware components installed in the respective vehicle;
determining, by the server, based on the one or more identifiers, which of the one or more aftermarket hardware components require updating;
aggregating, by the server, software updates for each of the one or more aftermarket hardware components that require updating;
transmitting, by the server, the aggregated software updates to the respective vehicle; receiving, by the respective vehicle, from the server, the aggregated software updates;
flashing, by the respective vehicle, software modules corresponding to the aggregated software updates;
determining, by the respective vehicle, one or more of the aftermarket hardware components that failed to update;
restoring, by the respective vehicle, software modules of the one or more aftermarket hardware components that failed to update to a previous state;
wirelessly transmitting, by the respective vehicle, a notification of the one or more aftermarket hardware components that failed to update to the server;
receiving, by the server, the notification of one or more aftermarket hardware components that failed to update;
re-transmitting, by the server, software updates for the failed one or more software modules of the one or more aftermarket hardware components;
receiving, by the respective vehicle, the re-transmitted software updates; and
re-flashing, by the respective vehicle, the software modules of the one or more aftermarket hardware components that failed to update.

5. The method of claim 4, wherein received module versions are compared against stored module versions from a module database to determine which modules require updating.

6. The method of claim 5, further comprising determining which stored module versions from the module database are appropriate for comparison purposes based at least in part on the one or more aftermarket hardware components installed in each respective vehicle.

7. A non-transitory computer readable storage medium, storing instructions that, when executed by a processor, cause the processor to perform a method comprising:

receiving, by the processor, a plurality of wireless update requests from a plurality of vehicles; and for each of the plurality of wireless update requests:

retrieving, by the processor, vehicle data based on an identifier of a respective vehicle, wherein the vehicle data comprises one or more identifiers that identify one or more aftermarket hardware components installed in the respective vehicle;

determining, by the processor, based on the one or more identifiers, which of the one or more aftermarket hardware components require updating;

aggregating, by the processor, software updates for each of the one or more aftermarket hardware components that require updating;

transmitting, by the processor, the aggregated software updates to the respective vehicle; receiving, by the respective vehicle, from the processor, the aggregated software updates;

flashing, by the respective vehicle, software modules corresponding to the aggregated software updates;

determining, by the respective vehicle, one or more of the one or more aftermarket hardware components that failed to update;

restoring, by the respective vehicle, software modules of the one or more aftermarket hardware components that failed to update to a previous state;

wirelessly transmitting, by the respective vehicle, a notification of the one or more aftermarket hardware components that failed to update to the processor;

receiving, by the processor, the notification of the one or more aftermarket hardware components that failed to update;

re-transmitting, by the processor, software updates for the one or more aftermarket hardware components that failed to update;

receiving, by the respective vehicle, the re-transmitted software updates; and re-flashing, by the respective vehicle, the software modules of the one or more aftermarket hardware components that failed to update.

8. The non-transitory storage medium of claim 7, wherein received module versions are compared against stored module versions from a module database to determine which modules require updating.

* * * * *